United States Patent [19]

Jeanne et al.

[11] Patent Number: 5,618,050
[45] Date of Patent: *Apr. 8, 1997

[54] CYLINDER HEAD GASKET, IN PARTICULAR FOR AN INTERNAL COMBUSTION ENGINE AND RELATED MANUFACTURING METHOD

[75] Inventors: Olivier Jeanne, Chamboret; Georges Ulmer, Limoges; Daniel Montresor, Nantiat, all of France

[73] Assignee: Meillor S.A., Nantiat, France

[*] Notice: The portion of the term of this patent subsequent to May 5, 2014, has been disclaimed.

[21] Appl. No.: 564,929

[22] Filed: Nov. 30, 1995

Related U.S. Application Data

[63] Continuation of Ser. No. 204,407, May 5, 1994, abandoned.

[30] Foreign Application Priority Data

Sep. 13, 1991 [FR] France .................................. 91 11319
Feb. 25, 1992 [FR] France .................................. 92 02171

[51] Int. Cl.$^6$ .......................................... F16J 15/12
[52] U.S. Cl. ................... 277/235 B; 277/180; 277/231; 277/233
[58] Field of Search .................................. 277/231, 233, 277/235 B, 180, 227, 229, 232, 235 R, 235 A

[56] References Cited

U.S. PATENT DOCUMENTS

| | | | |
|---|---|---|---|
| 2,026,854 | 1/1936 | Victor | 277/235 B |
| 2,084,054 | 6/1937 | Balfe | 277/235 B |
| 2,992,151 | 7/1961 | Niessen | 277/235 B |
| 3,430,611 | 3/1969 | Belter | 277/235 B |
| 4,204,691 | 5/1980 | Takase et al. | 277/235 B |
| 4,234,638 | 11/1980 | Yamazoe et al. | 277/235 B |
| 4,635,949 | 1/1987 | Lucas et al. | 277/235 B |
| 4,723,789 | 2/1988 | Belter et al. | 277/235 B |
| 4,776,602 | 10/1988 | Gallo | 277/233 |
| 4,813,687 | 3/1989 | Nakayama | 277/235 B |
| 4,955,621 | 9/1990 | Skrycki | 277/235 B |
| 5,004,249 | 4/1991 | Grosch et al. | 277/207 R |

FOREIGN PATENT DOCUMENTS

| | | |
|---|---|---|
| 0693461 | 11/1930 | France . |
| 0787191 | 9/1935 | France . |
| 1333891 | 12/1963 | France . |
| 2019507 | 10/1979 | United Kingdom . |

*Primary Examiner*—Daniel G. DePumpo
*Attorney, Agent, or Firm*—Pollock, Vande Sande & Priddy

[57] ABSTRACT

A sheet gasket, particularly for internal combustion engines, consisting of at least one metal sheet forming a core which is cut to match the mating face, and elastomeric portions, particularly in bead form, which are bonded to said sheet around holes to be sealed. The gasket includes a single-piece elastomeric covering placed on part of the sheet surface to form localized sealing projections around the holes to be sealed. A related manufacturing method is also provided.

17 Claims, 3 Drawing Sheets

CYLINDER HEAD GASKET, IN PARTICULAR FOR AN INTERNAL COMBUSTION ENGINE AND RELATED MANUFACTURING METHOD

This application is a continuation of U.S. patent application Ser. No. 08/204,407, filed May 5, 1994, now abandoned.

FIELD OF THE INVENTION

The present invention relates to a cylinder head gasket, in particular for an internal combustion engine, and to the related manufacturing method.

BACKGROUND OF THE INVENTION

Many types of cylinder head gaskets are known. These fall mainly into two categories, namely, fibrous gaskets and metallic gaskets, or more precisely metallic-elastomeric gaskets.

Fibrous gaskets, which make up the main part of the market, comprise a metallic reinforcement, more particularly a metallic sheet provided with lugs, a packing based on a cardboard of compressible fibrous material which is hooked onto the lugs of the sheet, and strengthening elements of different types, in particular localized deformations and/or eyelets and/or inserts.

Such gaskets present the important advantage, of permitting good distribution of the clamping loads, whereby it is possible to reduce the difference in stiffness between the strengthening elements and the rest of the gasket.

However, these gaskets with hooked material are not fully satisfactory.

Firstly, the packing is made in the form of a semi-worked material which requires a processing of the products, a large stock of the various cardboards employed, inspections upon receipt of the cardboards and inspection of the finished products.

The sealing properties in the heart of the packing, and therefore the gasket including such packing, are also open to criticism.

Further, the mounting of the strengthening elements must be achieved by special techniques, namely, adhesion, an insert combined with seam means the utility of which is reduced to merely the maintenance in position of the insert before mounting the gasket on the engine, spot-welding on the metallic part prior to the mounting of the packing, for example.

Cylinder head gaskets also ensure the sealing of the associated cooling and lubricating fluid circuits, and, in the case of gaskets having hooked material, it is most often necessary to employ a screen printing operation. These gaskets having hooked material must very often undergo additional treatments such as impregnation or varnishing.

The metallic gaskets, more precisely the metallic-elastomeric gaskets, are made in different ways. A first type of such gaskets comprises a plurality of superposed previously cut-out sheets, with seal means on the periphery of the apertures corresponding to the cylinders, and molded elastomeric beadings.

Thus the gas-tight seal is obtained in the known way by metallic means which ensure good resilient reaction quality, zero creep and good thermal behavior.

A liquid-tight seal is achieved by the molded elastomeric beadings.

Theoretically, such a gasket allows a substantial reduction in cylinder block-cylinder head clamping loads, since the pressures of contact are localized solely in the region where a seal is necessary.

However, the difference in the stiffness between the eyelet and the elastomeric beading is such that this assembly is rendered difficult if clamping bearing elements are not judiciously disposed on the perimeter of the gasket.

In this case, the distributions of pressure are very discontinuous, and this results in large concentrations of stresses in the cylinder head. However, at present this design is the only one which allows a reduction in the clamping loads.

The liquid-tight seal is perfect provided that the molding is of high quality indeed, any defect results in leakage since there is no secondary seal, solely the molded beading constituting the barrier.

On the other hand, sealing against gases is excellent since the arrangement employing eyelets is a well-tried method.

Another type of metallic/elastomeric gasket is at present on the market.

This type comprises a stack of sheets coated with a thin coating of elastomer, a few hundredths of a millimeter in thickness, more particularly selected from those of the nitriles family.

In this case, the clamping loads are rather uniformly distributed over the area of the gasket in a way similar to fibrous gaskets.

The gas-tight seal is obtained by a peripheral deformation of the stack of sheets in the region of the openings corresponding to the bores.

In this case, the gas-tight seal is good, since the slight creep of the nitrile elastomer permits achieving a good adaptability of the eyelet.

On the other hand, this type of gasket has a serious drawback. As the elastomer is deposited in a very thin layer, it permits providing rather long leakage passages for liquids, which imparts to this type of gasket a good liquid-tight seal, but does not allow the absorption of high roughness. Further, the joint plane must be perfectly machined with a very good surface state.

Moreover, it is impossible to vary the thickness of the deposited elastomeric layer since these elastomers become brittle in a thick layer, and in any case, the elastomer does not penetrate between the different sheets of the stack. The different sheets are therefore not bonded to one another by the elastomer, which only has a sealing function.

Further, as the sheets are smooth, there is no resilient effect and the adaptability of such a gasket to requirements remains very poor.

It must also be noted that the deposition of nitrile elastomer is delicate and, when employed in a thin layer, it cannot be produced by molding, and this still further limits its adaptability.

Lastly, such a gasket does not easily permit varying the stiffness locally, so that the gasket is perfectly homogeneous and will be clamped outside the eyelet with a pressure which is identical throughout its area, except on the periphery of the ribs in the region of the associated circuits.

SUMMARY OF THE INVENTION

An object of the present invention is to overcome the drawbacks of the aforementioned cylinder head gaskets and to provide additional advantages.

The cylinder head gasket according to the invention permits excellent distribution of the clamping loads throughout the area of the gasket, while enabling locally varying this load. The gasket also makes it possible to avoid screen printing and the various subsequent treatments of the fibrous gaskets for affording the liquid-tight seal, since it provides a double seal, namely, a primary and a secondary seal, as concerns fluids with a maximum leakage path. It moreover results in the provision of a gasket in one piece obtained from a molding of the elastomer, whence an improved mounting facility. This gasket has very close tolerances and results in a very close observance of the clamped thicknesses.

The gasket may be equipped with all of the known eyelet system for providing the gas-tight seal, which arrangements are reliable and well-tried and the quality of which cannot be doubted.

The manufacture, apart from being precise, requires no specific means, the number of steps is reduced, and the metallic sheets making up this gasket are perfectly bonded together.

This gasket also has the advantage of resisting well the "fretting" phenomenon, and it is also able, owing to the creep of the elastomer, to absorb a high degree of roughness of the joint plane, which gives it a high capacity for receiving imprints.

During manufacture, simple weight controls permit checking that all the component parts of the gasket are assembled and, by taking advantage of the color of the elastomeric composition, it is possible to distinguish the different thicknesses of the cylinder head gaskets provided for sealing the same engine, for example a diesel engine.

The present invention therefore provides a conventional metallic/elastomeric cylinder head gasket and the associated manufacturing method.

The cylinder head gasket according to the invention, in particular for an internal combustion engine, comprises a reinforcement including at least one metallic sheet combined with an elastomeric material, and has openings corresponding to the cylinders of the engine, to the associated cooling and lubricating fluid circuits, and to the clamping studs. The cylinder head gasket comprises resilient bearing elements distributed over at least a part of the area of the gasket.

According to another characteristic of the invention, the reinforcement is embedded in the elastomeric material constituting the gasket.

According to a particular embodiment of the invention, the distributed resilient bearing elements comprise resilient deformations provided in the sheet or sheets which project from each side of the sheet or each of the sheets.

According to another characteristic of the invention, the resilient deformations provided in the sheet or sheets are symmetrical relative to the median plane of the sheet or each of the sheets.

According to another characteristic, the reinforcement comprises a stack of superposed sheets, at least one of which is provided with distributed resilient bearing elements, the other sheets being smooth.

At least one of the sheets of the reinforcement comprises at least one localized cut-out part to permit adjusting the stiffness of the gasket in the region of this cut-out part.

In a particular embodiment of the invention, the sheets of the reinforcement have variable thicknesses.

The sheet is a previously work hardened sheet in which have been cut out and bent lamellar portions which are then calibrated so as to obtain S-shaped deformations, these lamellar portions having good resilient properties.

According to a particular embodiment, the gasket comprises at least one strengthening element disposed in the region of the periphery of each of the openings corresponding to the cylinders, for the purpose of locally increasing the capacity to withstand forces.

According to another characteristic of the invention, the strengthening element is a localized deformation of the sheet or sheets making up the reinforcement and/or an eyelet.

According to a particular embodiment, the strengthening element is an added member of the insert type.

According to another characteristic, the sheets of the reinforcement are bonded together by the elastomeric material constituting the packing.

The cylinder head gasket also has the feature that the added member constituting the strengthening element is bonded to the reinforcement by the elastomeric material of the packing.

Further, the packing comprises localized extra thick sealing portions of elastomeric material, in particular in the region of the openings corresponding to the associated circuits.

Further, the packing has a variable thickness so as to accommodate the different deformations of the cylinder head and the cylinder block during operation.

According to another characteristic of the invention, the packing comprises impressions on at least one of its two sides to improve the capacity to receive imprints of the joint planes of the cylinder head and cylinder block.

According to a particular embodiment of the invention, the elastomeric material has a low dynamic viscosity and is more particularly selected from the silicones family so as to permit filling the different interstices.

The method for manufacturing the cylinder head gasket according to the invention comprises the following steps:

deforming at least one sheet having the shape of the gasket to be manufactured, on each side of the plane thereof, for producing a reinforcement wih distributed resilient bearing elements, optionally stacking a plurality of sheets, optionally positioning strengthening elements, depositing a packing of elastomeric material.

According to a particular embodiment of the invention, for the purpose of obtaining the deformation of the sheet or sheets, the method comprises producing lamellar portions, in particular by cutting out and bending, calibrating the sheet or sheets thus provided with resilient lamellar portions so as to impart to the sheet or sheets a free thickness greater than the nominal thickness of the sheet before deformation, the lamellar portions thus provided acting in the manner of springs under load.

According to a particular embodiment, in the case where the reinforcement comprises a strengthening element and/or the deposition of the packing is achieved by molding, the method comprises putting the strengthening element in the required position, without prior deformation, in the mold with the reinforcement, and producing the required deformation in the mold itself by means of the mould closing pressure and the profile of the mould.

BRIEF DESCRIPTION OF THE DRAWINGS

The invention will now be described with reference to the accompanying drawings, in which:

FIG. 1 shows is a reinforcement 8 having a sheet 10 including lamellar portions 12. These lame-liar portions are cut in the sheet by a press operation and deformed in such manner as to produce a first deformation 14 at the foot of the lamellar portion, and are then calibrated so as to impart thereto a second deformation 16 in the other direction.

The nominal thickness e becomes the free thickness E since the lamellar portions after calibration remain plastically deformed in accordance with a substantially S-shaped profile, therefore having a double deformation.

The lamellar portions are distributed in a symmetrical manner on each side of the sheet, each lamellar portion being in fact composed of two confronting tongues 18. The cut-out shape of these tongues is substantially rectangular.

Figure 1:
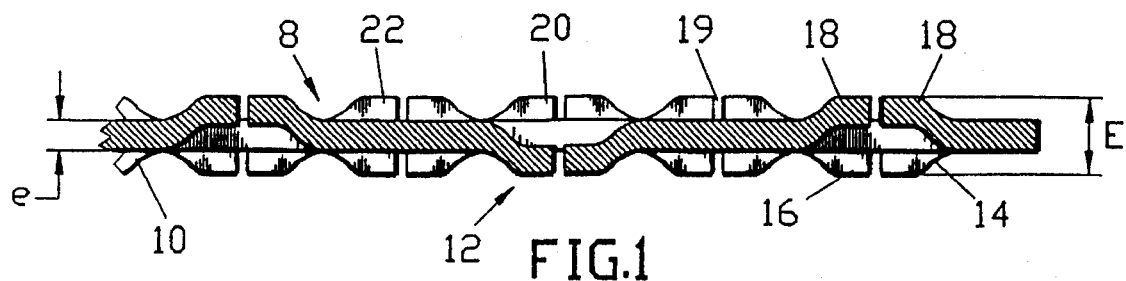
FIG. 1 is a partial sectional view of a sheet for manufacturing a cylinder head gasket according to the invention.

In FIG. 1, the sheet is shown in the plane of the section by hatching, while the lamellar portions 20 of the first parallel row and the lamellar portions 22 of the third row parallel to the row of lamellar portions of the plane of the section are shown in solid lines. These lamellar portions are in fact arranged in staggered relation.

The sheet is usually a sheet of a work hardened metal which may have undergone a specific treatment for imparting thereto better resilient properties.

On the other hand, it is subjected to a calibration which permits converting the hooks into resilient lamellar portions forming as many return springs.

Figure 2:
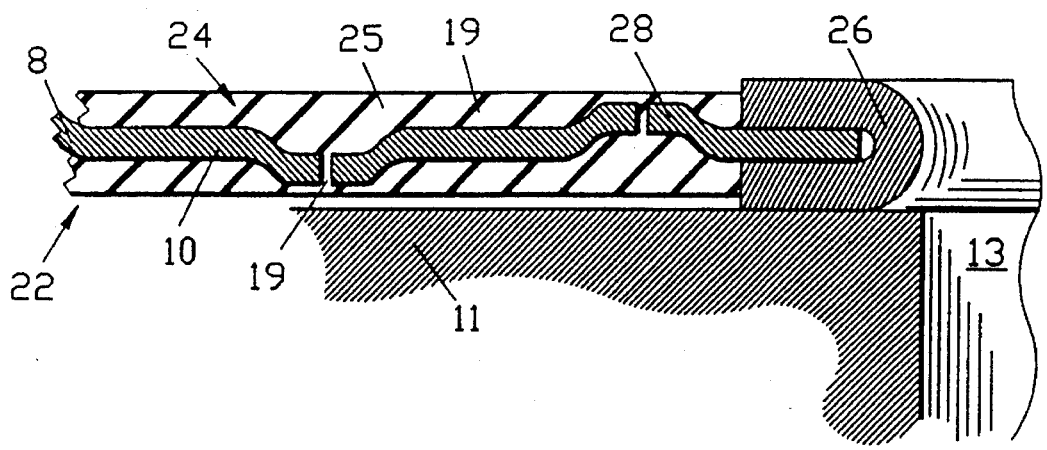
FIG. 2 is a partial sectional view of a cylinder head gasket according to the invention.

In FIG. 2, the sheet of FIG. 1 provided with lamellar portions and calibrated is used for producing a cylinder head gasket according to the invention.

This cylinder head gasket 22 comprises the sheet 10 provided with lamellar portions and calibrated, constituting the reinforcement 8, and a packing 24 formed by an elastomeric matrix 25.

In FIG. 2, the cylinder head gasket is mounted on a cylinder block 11 and is shown with an opening 13 corresponding to a cylinder of the engine.

Further, in alignment with the opening 13, the cylinder head gasket 22 comprises a C-section eyelet of known type.

The reinforcement 8 of the cylinder head gasket obtained is embedded in the elastomeric matrix 25 of the packing 24.

All of the lamellar portions constitute distributed resilient bearing elements 28.

The manufacture of this gasket comprises the following steps:

deforming the sheet so as to produce lamellar portions constituting distributed resilient bearing elements 28, placing the strengthening element, namely the eyelet 26, in position, and depositing the packing 24 of elastomeric material.

This deposition may be advantageously achieved by molding and injecting the elastomer.

Likewise, the strengthening element may be deformed simultaneously with the moulding operation owing to the force for closing the mold, as will be explained hereinafter.

The lamellar portions, may be produced simply by a press operation and then introduced into a calibrating machine.

Figure 7:
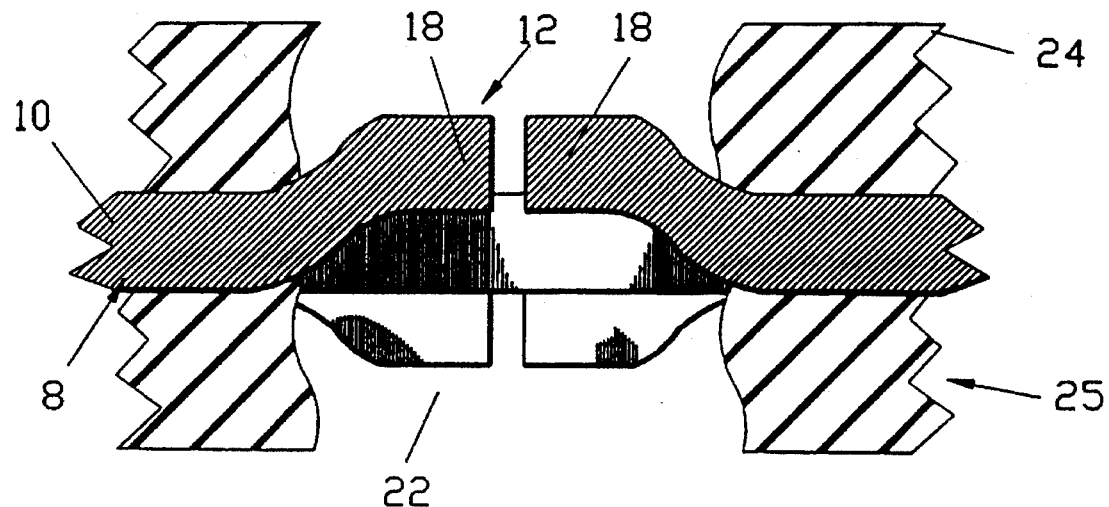

FIG. 7 schematically shows a lamellar portion 12 in the foreground and a lamellar portion 22 at the rear. The elastomeric matrix 25 of the packing 24 is also shown.

The S-shaped deformation of each of the tongues 18 imparts thereto resilient properties similar to a return spring.

As these tongues are perfectly symmetrical, the distributed resilient bearing elements operate in a homogeneous manner on each side of the gasket with respect to the joint planes of the cylinder block and cylinder head.

When a clamping load is exerted, the gasket is crushed, the load being taken up throughout the area of the gasket by the distributed resilient bearing elements, i.e., by a multitude of return springs distributed in a homogeneous manner except in the region of the eyelets, which absorb substantially 50% of the load in the known manner.

The elastomer participates to a small extent in this taking of the loads. It is distributed between the tongues, between the thickness e and the thickness E, as well as on top of the tongues, but in a very thin layer.

This layer has no specific function. Each pair of tongues projecting from one side or the other is surrounded by elastomer, as a land, which imparts to this gasket maximum leakage paths as concerns fluids.

Further, the gas-tight seal obtained by means of a strengthening element of known type, such as an eyelet, is of high quality, these arrangements having been well-tried over a long period.

Moreover, the large number of existing eylets permits a good adaptability. New eyelets may even be used, since the bonding by means of the elastomer permits effective pre-positioning.

Figure 3:
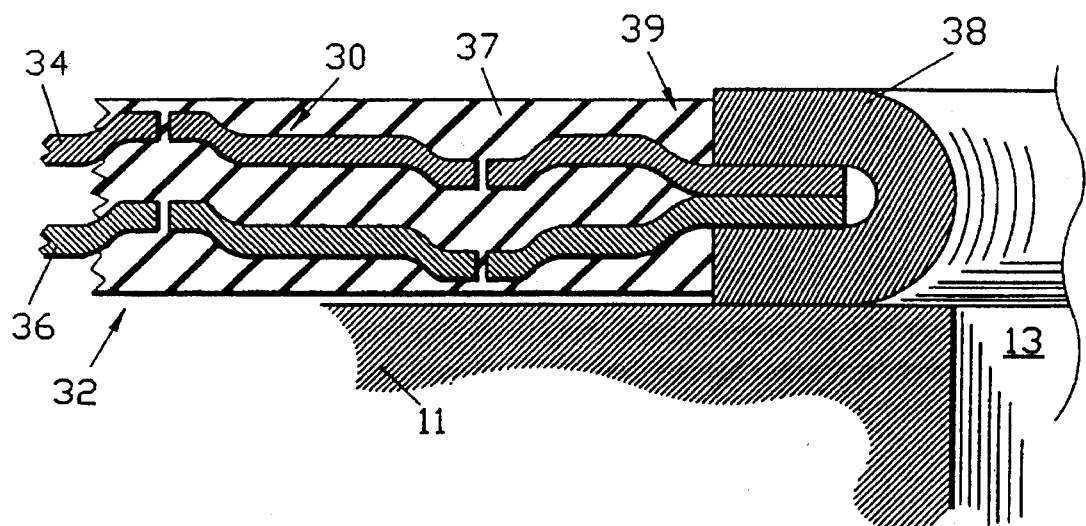
FIG. 3 is a view of a variant of the cylinder head gasket according to the invention, with a stack of sheets.

FIG. 3 shows a variant of a cylinder head gasket 32 comprising a reinforcement 30 having multiple sheets, namely, two sheets 34, 36.

These sheets are provided with lamellar portions and calibrated in a manner similar to the previously-described sheet 10.

In this case, the eyelet 38 is mounted to be clipped over the two sheets simultaneously, these sheets being deformed. The elastomeric matrix 37 of the packing 39 covers the two sides of the stack of sheets but also infiltrates between the sheets and bonds the latter together.

Likewise, the eyelet is bonded on its edges, but the elastomer does not penetrate to the interior of the eyelet since its passage is prevented by the residual clamping force of the eyelet on the reinforcement, which force is greater than the pressure of injection.

In the case of a cylinder head gasket having multiple sheets, each of the sheets may be so cut out that, locally, there remains only a single sheet or, inversely, a member of the insert type may be disposed between the sheets for locally increasing the stiffness.

The packing is produced by molding in the same way as for a gasket having a single sheet, and, in order to improve the capacity to receive imprints, the surface of the packing is provided with impressions, for example having a cup shape.

Figure 4:
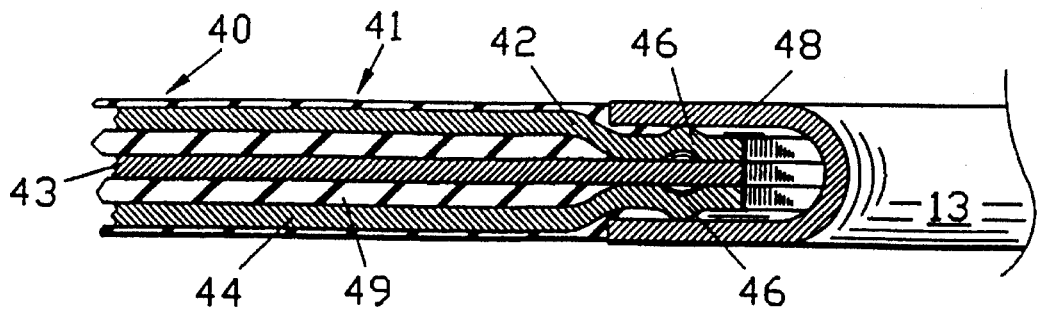
FIG. 4 is a view of a variant of a cylinder head gasket with an eyelet mounted on a prior peripheral deformation of the sheets around openings corresponding to the cylinders of the engine.

In FIG. 4, the gasket 40 comprises a reinforcement 41 including a stack of three sheets 42, 43, 44, the median sheet 43 being a smooth sheet whereas the upper and lower sheets 42, 44 are sized and provided with lamellar portions (omitted from the drawings for the sake of clarity).

This stack is deformed on the periphery of the opening 13 corresponding to the cylinder of the engine, and the lower and upper sheets each comprise a boss 46.

The stack is embedded in an elastomeric matrix 49 which ensures, in addition to the seal, the bonding together of the three sheets. This embodiment may comprise all the types of eyelets known at the present time, whether it concerns a single deformation of an eyelet 48 having a double C-shaped profile, a stack of three sheets with a median insert or with an added insert in the form of a washer.

Figure 5:
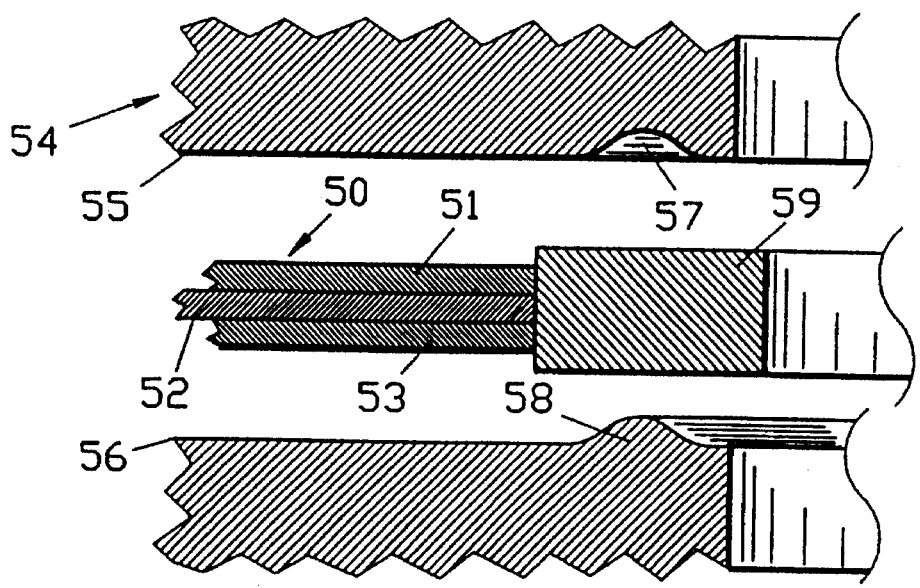
FIGS. 5 and 6 are schematically views illustrating a particular method for producing a cylinder head gasket according to the invention, FIG. 7 schematically shows lamellar portions of a cylinder head gasket according to the invention for the purpose of explaining its behavior.
Figure 6:
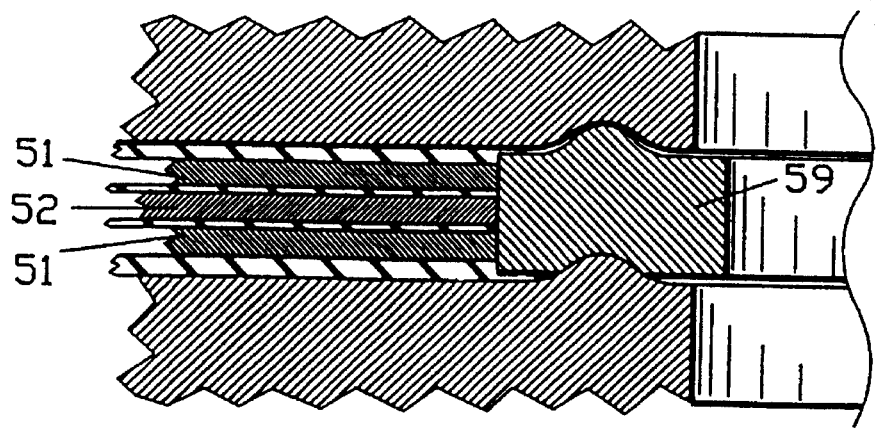

FIGS. 5 and 6 show two different steps of a particular method for manufacturing a cylinder head gasket according to the invention.

The stack of three sheets 51, 52 53 constituting the reinforcement 50 is placed in a mold 54 whose faces 55 and 56 are respectively provided with a depression 57 and a confronting boss 58. The strengthening element constituting the eyelet 59 is disposed without deformation in the mold in the region of the edge of the three sheets 51, 52 and 53.

When the mold is closed, as shown in FIG. 6, the strengthening element, in the present instance the eyelet 59, is deformed and adopts the profile defined between the boss 58 and the hollow 57.

The elastomer must now be injected and this bonds the sheets together and maintains the eyelet against the edge of the sheets.

Bearing in mind the high precision of the manufacture of the molds, the eyelet must be positioned with very strict tolerances.

Figure 8:
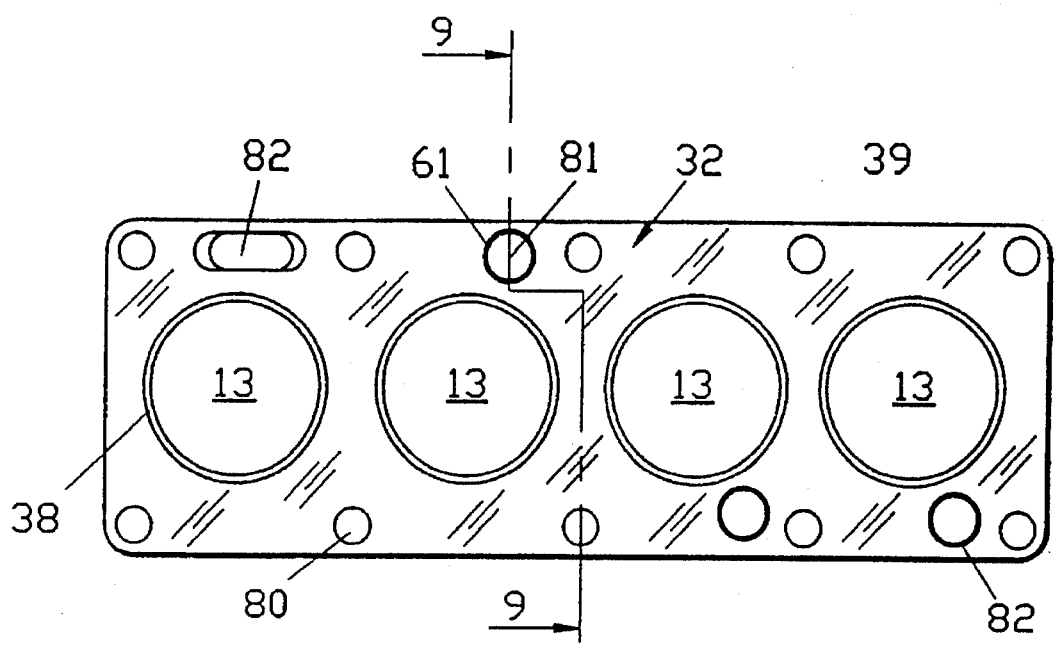
FIG. 8 is a top plan view of a cylinder head gasket according to the invention.

FIG. 8 shows a cylinder head gasket 32 seen from above with the openings 13 corresponding to the cylinders, the eyelet 38, and the packing 39.

Also shown are the openings 80 corresponding to the passage of the clamping studs, and the openings 81 corresponding to the passage of the associated fluid circuits, namely, the cooling or lubricating fluid, together with some special cavities 82.

Figure 9:
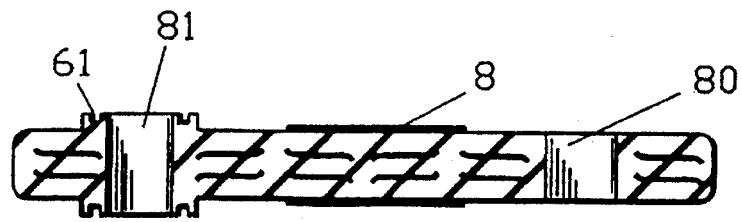
FIG. 9 is a sectional view taken on line 9—9 of FIG. 8.

This cylinder head gasket is shown in section in FIG. 9 taken on line 9—9 of FIG. 8.

The present invention permits special gaskets for the fluids to be provided in the region of the openings 81, corresponding to the associated circuits.

Owing to the molding operation, the elastomer is deposited with an extra thickness 61 on the periphery of the openings of the associated circuits. Such a gasket provides in this way an excellent fluid-tight seal.

Further, as the peripheral lip is molded with the entire elastomeric matrix, it has a very high resistance to being torn away.

The advantages of the cylinder head gasket just described are considerable.

The distributed resilient bearing elements, the stiffness of which may be varied, permit avoiding excessive deformations from one zone to the other of the gasket.

As the stiffness is controlled, this results in a good equilibrium of the joint, and it is known that the control of the stiffness permits controlling the transmission of the forces.

This immediately permits the gasket to contribute by its stiffness to the stiffness of the engine since the forces clamping the cylinder head on the cylinder block of the engine are evenly distributed and controlled.

The gasket according to the invention also has an important advantage above all for future engines, since it permits an excellent control of the clamped thicknesses during the life of the gasket, so that the volume of the combustion chamber does not vary, thereby avoiding variations in the quality of the combustion. This permits participating in the prevention of pollution.

The color of the elastomer may be varied and in this case a color code may be established in accordance with the thicknesses, in correlation with the .position of the pistons relative to the top design of the cylinder block. This is of particular interest in the case of diesel engines.

Indeed, the thickness of the gasket may vary in very small increments and it is sufficient for this purpose to add thin sheets which perform the function of spacer members when manufacturing this gasket (see FIG. 10).

We claim:

1. In an assembly comprising a first planar part and a second planar part, and comprising clamping means applying clamping loads for tightening one of said planar parts against the other, a gasket intercalated between said planar parts, said gasket comprising a reinforcement including at least two metallic sheets combined with a packing constituted by elastomer, said gasket having passage openings to be sealed, wherein at least one face of one of said at least two metallic sheets is provided with distributed resilient load bearing elements extending from said at least one face towards one of said planar parts and terminating in a free branch which is substantially parallel to said one of said planar parts, and wherein said resilient load bearing elements are adapted to take said clamping loads and, upon variation of said clamping loads, to bias said packing toward said one of said planar parts.

2. The cylinder head gasket according to claim 1, wherein said reinforcement is embedded in said elastomer so that said elastomer is distributed mainly between said resilient bearing elements and between said sheets.

3. The cylinder head gasket according to claim 1, wherein said resilient bearing elements comprise resilient deformations.

4. The cylinder head gasket according to claim 3, wherein said resilient deformations are provided on both faces of a corresponding sheet and project symmetrically relative to a median plane of said sheet.

5. The cylinder head gasket according to claim 1, wherein said reinforcement comprises a stack of superposed sheets, at least one of said sheets of said stack being provided with said distributed resilient bearing elements and at least one of said sheets of said stack being a smooth sheet devoid of a resilient bearing element and acting as a spacer member.

6. The cylinder head gasket according to claim 1, wherein said sheet provided with said resilient bearing elements is a previously work-hardened sheet provided with lamellar portions and calibrated in such manner as to provide S-shaped deformations as seen in a cross-sectional view, so as to avoid localized punching.

7. The cylinder head gasket according to claim 1, wherein said gasket comprises strengthening elements disposed on a periphery of passage openings corresponding to cylinders of said engine and provided for locally increasing stiffness of said gasket and the capacity to take loads.

8. The cylinder head gasket according to claim 7, wherein each strengthening element is an eyelet.

9. The cylinder head gasket according to claim 7, wherein each strengthening element is an added insert.

10. The cylinder head gasket according to claim 9, wherein said added insert is bonded to said reinforcement by the elastomer.

11. The cylinder head gasket according to claim 1, wherein said sheets of said reinforcement are bonded by the elastomer constituting said packing.

12. The cylinder head gasket according to claim 1, wherein said packing comprises extra sealing thicknesses of elastomer.

13. The cylinder head gasket according to claim 12, wherein said extra thicknesses are localized on a periphery of some of said openings to be sealed.

14. The cylinder head gasket according to claim 12, wherein said extra thicknesses are localized in positions facing localized apertures provided in at least one of said sheets of said reinforcement.

15. The cylinder head gasket according to claim 1, wherein the packing has a variable thickness so as to accommodate differential deformations of said cylinder head and said cylinder block in operation.

16. The cylinder head gasket according to claim 1, wherein at least one face of said packing comprises impressions so as to improve a capacity to receive imprints of the joint planes of said cylinder head and said cylinder block.

17. The cylinder head gasket according to claim 1, wherein said elastomer is selected from the silicones family so as to permit filling of interstices in said reinforcement.

* * * * *

UNITED STATES PATENT AND TRADEMARK OFFICE
CERTIFICATE OF CORRECTION

PATENT NO. : 5,618,050
DATED : April 8, 1997
INVENTOR(S) : Olivier JEANNE et al.

It is certified that error appears in the above-identified patent and that said Letters Patent is hereby corrected as shown below:

On the title page item [63], should read

--[63] Continuation of Ser. No. 204,407, filed as PCT/FR92/00860, filed Sep. 14, 1992--.

Signed and Sealed this

Thirty-first Day of March, 1998

*Attest:*

BRUCE LEHMAN

*Attesting Officer*  Commissioner of Patents and Trademarks